(12) United States Patent
Ammirata

(10) Patent No.: US 7,209,353 B2
(45) Date of Patent: Apr. 24, 2007

(54) HERMETICALLY SEALED ACCESS POINT FOR A WIRELESS NETWORK

(76) Inventor: Sergio Ammirata, 788 NW. 127 Ave., Coral Springs, FL (US) 33071

( * ) Notice: Subject to any disclaimer, the term of this patent is extended or adjusted under 35 U.S.C. 154(b) by 222 days.

(21) Appl. No.: 11/074,030

(22) Filed: Mar. 7, 2005

(65) Prior Publication Data

US 2006/0198103 A1 Sep. 7, 2006

(51) Int. Cl.
*H05K 7/20* (2006.01)
(52) U.S. Cl. ........................ 361/695; 454/184
(58) Field of Classification Search .............. 361/695
See application file for complete search history.

(56) References Cited

U.S. PATENT DOCUMENTS 6,640,084 B2 * 10/2003 Pande et al. ............. 455/3.01
2004/0075982 A1 * 4/2004 Kim et al. ................. 361/687
2004/0218362 A1 * 11/2004 Amaro et al. ............. 361/697
2006/0155619 A1 * 7/2006 Rhiando et al. ............ 705/35
2006/0160205 A1 * 7/2006 Blackburn et al. ........ 435/287.2

* cited by examiner

Primary Examiner—Greg Thompson
(74) Attorney, Agent, or Firm—Ruben Alcoba, Esq

(57) ABSTRACT

The present invention is based on the theory of forced air convection. In a hermetically sealed access point/computer, by placing a blowing fan perpendicular to the hot elements of the computer and thereby circulating the air around the housing of the computer the present invention speeds the rate of heat transfer from within the housing to the outside of the housing, thereby reducing the heat that the hardware of a computer has to endure within the housing.

6 Claims, 1 Drawing Sheet

HERMETICALLY SEALED ACCESS POINT FOR A WIRELESS NETWORK

BACKGROUND

It is known in the art of computers that for the hardware in computers to stay operable, the hardware within a computer must not be allowed to overheat. The computer industry normally uses fans to move the warm air within a computer outward.

Unfortunately, when placing computers outdoors this is not an option because of the elements. Computers placed outdoors must be sealed so that the elements or other nuisances do not enter the computers. The problem with sealing computers that are placed outdoors is that when the computers are running, the hardware within the computers will heat to substantially higher degrees than the hardware's environment.

An object of this invention is to provide a solution to the above mentioned problems in sealed computers. The inventor has invented a way of positioning elements within a computer to more efficiently dissipate the heat created within a computer.

SUMMARY

The present invention is directed to a hermetically sealed access point, a computer, that satisfies the need of transferring the heat from the hardware of the computer to the environment. A hermetically sealed access point having features of the present invention comprises a housing having an electrical inlet and an antennae inlet, a plate having a first plurality of spacers, an antennae, a power source having a heat sink and an electrical cord, a motherboard having a CPU and a second plurality of spacers, and a fan having a blowing end and a base end: the plate's first plurality of spacers attach to the inner side of the housing, the antennae attaches to the antennae inlet of the housing, the power source's heat sink attaches to the plate and the power source's cord passes outward through the electrical inlet, the motherboard's spacers attach to the plate so that the motherboard is on top of the power supply and the motherboard connects to the antennae and the power supply, and the fan's base end attaches to the plate and connects to the motherboard.

The positioning of the above elements within the housing is the key to this invention. The housing of this invention is made of a conductive material that is resistant to the elements. The plate mounted on the housing is also made of a conductive material. The power supply is attached to the plate so that the heat sink of the power supply attaches to the plate, thereby transferring the heat generated by the power supply to the plate. The CPU is mounted on the motherboard so that one of the sides of the CPU is adjacent to one of the sides of the motherboard. The Fan is adjacent to the CPU and thereby blows perpendicular to the CPU. In another embodiment of this invention, at least one chipset is adjacent to the CPU and perpendicular to the fan.

The basic principle of this invention is that by having the fan blow on the CPU and the chipset, the heat that builds on the CPU and the chipset is circularly distributed within the housing, thereby increasing the surface area in which the heat can transfer out of the hermetically sealed access point, for heat always transfers from warm to cold. This invention uses the principle of forced air convection to reduce the hardware's heat build-up.

An objective of this invention is to prevent hardware placed within a hermetically sealed access point from overheating.

Another objective of this invention is to minimize the maintenance required in a hermetically sealed access point and to prevent down time produced by heat overloads.

Another objective of this invention is to prolong the life of a hermetically sealed access point.

DRAWINGS

These and other features, aspects, and advantages of the present invention will become better understood with regard to the following description, appended claims, and accompanying drawings where:

DESCRIPTION

Figure 1:
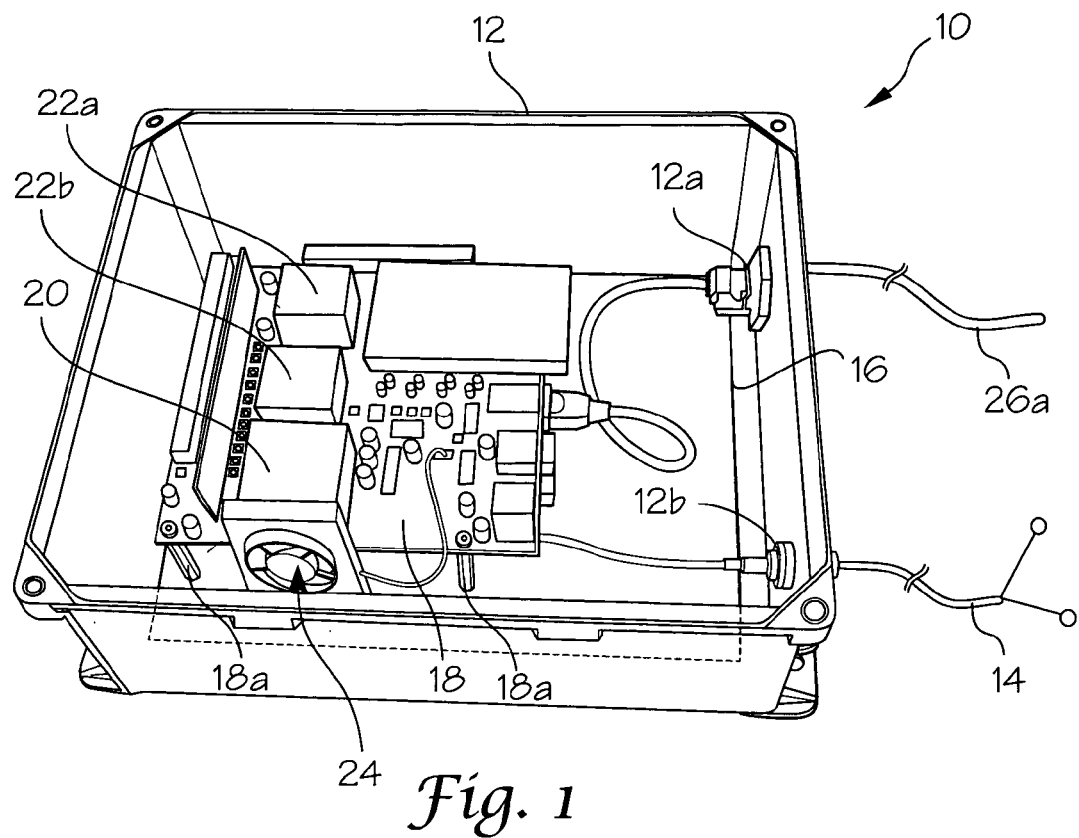
FIG. 1 shows a perspective view of the current invention.
Figure 2:
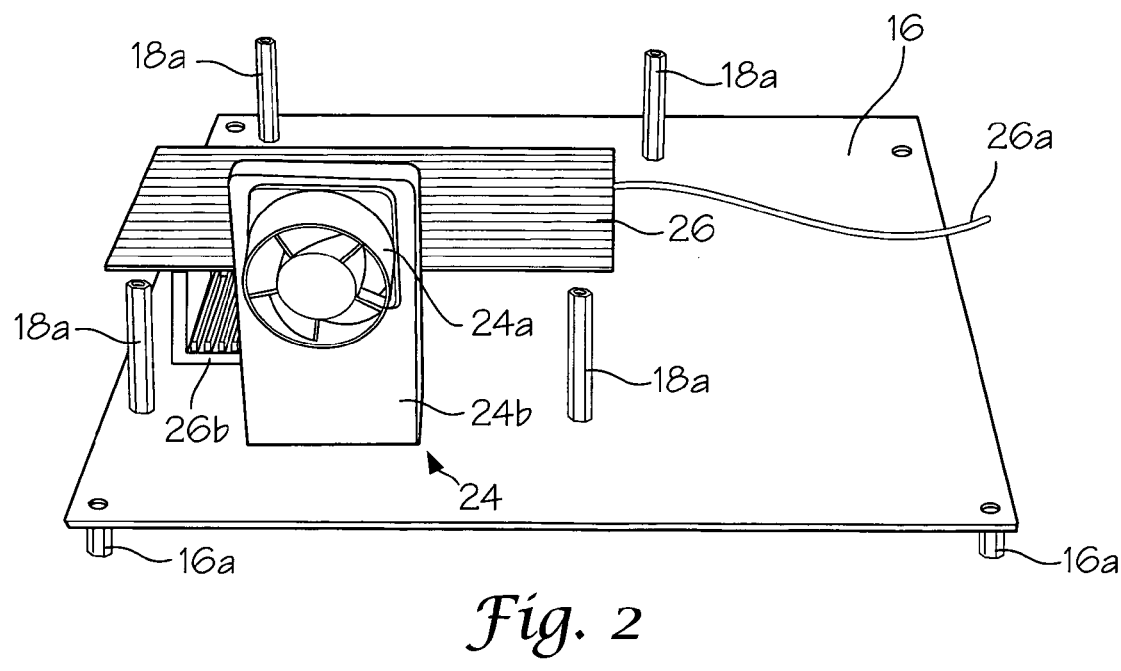
FIG. 2 shows another perspective view of the present invention.

As shown in FIG. 1, A hermetically sealed access point 10 comprises a housing 12, having an inner and an outer side, further having an electrical inlet 12a and an antennae inlet 12b, a plate 16 having a first plurality of spacers 16a, wherein the plate's spacers 16a attach to the inner side of the housing 12, an antennae 14 attached to the antennae inlet 12b, a power source 26, having a heat sink 26b and an electrical cord 26a, attached to the plate 16, wherein the heat sink 26b of the power source 26 is attached to the plate 16 and the power source's electrical cord 26a passes outward through the electrical inlet 12a, a motherboard 18 further attached to the plate 16 wherein the motherboard 18 has a CPU 20 mounted parallel and adjacent to one of the sides of the motherboard 18, the motherboard 18 is attached to the plate 16 using a plurality of spacers 18a so that power source 26 is directly beneath the motherboard 18, and the motherboard 18 connects to the power source 26 and the antennae 14, and a fan 24, having a blowing end 24a and a base end 24b, wherein the base end of the fan 24b is attached to the plate 16 and is positioned to blow directly perpendicular to the CPU 20 and abuts a peripheral edge of the motherboard 18, the fan 24 connects to the motherboard 18.

The housing 12 of the hermetically sealed access point 10 is made of fiberglass or any other similar conductive material known in the art that is weather resistant. The housing 12 has to be of sufficient size to house the recited elements above. The electrical inlet 12a of the housing 12 is sealed with materials known in the art after the electrical cord is passed through the electrical inlet 12a.

The plate 16 attaches to the housing 12 through the first plurality of spacers 16a and the plate is made of a metal. In the preferred embodiment, the plate 16 is made of aluminum.

In the preferred embodiment of this invention the antennae 14 is an 8db Omni-directional antenna. Any other antenna known in the art capable of transmitting Ethernet protocol can substitute for the preferred embodiment.

Any power source 26 strong enough to power the motherboard 18 is adequate for this invention. A key point of this invention is that the power source 16 must have its heat sink 26b attached to the plate 16. In an embodiment of this invention, the power supplied to the power source 26 is forty-eight volts power over Ethernet "PoE."

The motherboard 18, aside from the elements recited above, must have the required elements required to transmit a wireless Ethernet protocol. The elements required to transmit a wireless Ethernet protocol are know in the art. The second plurality of spacers 18a used to lift the motherboard 18 above the power source 26 are generic and known in the art. Standard CPUs 20 or the chipsets 22a/22b can be used with this invention. Another key point of this invention is the positioning between the motherboard 18, the CPU 20, the Chipsets 22a/22b, and the fan 24, more specifically the fan 24 has to be adjacent and perpendicular to the CPU 20.

In the preferred embodiment, the fan 24 works on the principle of magnetic levitation. However, other fans known in the art to create a minimal amount of heat can be used.

The present invention is based on the principle of forced air convection. The inventor realized by placing a fan in front of the hot elements of a computer and thereby circulating the air around a hermetically sealed housing he would be able to speed the rate of heat transfer from within the housing to outside of the housing. The reason for this is that by circulating the heated air throughout the housing 12 the air encounters more surface area to conduct through.

An advantage of this invention is that by preventing the hardware from overheating within the hermetically sealed access point, the access point will require less maintenance, and the access point will have less down time produced by heat overloads.

Another advantage of this invention is that the hermetically sealed access point has a longer life than other similar devices not using this concept.

Although the present invention has been described in considerable detail with reference to certain preferred versions thereof, other versions are possible. Therefore the spirit and the scope of the claims should not be limited to the description of the preferred versions contained herein.

What is claimed is:

1. A hermetically sealed access point comprising:
   a housing, having an inner and an outer side, further having an electrical inlet and an antennae inlet;
   a plate attached to the inner side of the housing;
   an antennae attached to the antennae inlet;
   a power source, having a heat sink and an electrical cord, attached to the plate,
   wherein the heat sink of the power source attaches to the plate and the power
   source's electrical cord passes outward through the electrical inlet;
   a motherboard further attached to the plate wherein the motherboard has a CPU
   mounted parallel and adjacent to one of the sides of the motherboard, the
   motherboard attaches to the plate using a plurality of spacers so that power source
   is directly beneath the motherboard, and the motherboard connects to the power
   source and the antennae; and
   a fan, having a blowing end and a base end, wherein the base end of the fan is
   attached to the plate and is positioned to blow directly perpendicular to the CPU
   and abuts a peripheral edge of the motherboard, the fan connects to the motherboard.

2. The hermetically sealed access point of claim 1, further comprising at least one chipset positioned adjacent to the CPU and perpendicular to the fan.

3. The hermetically sealed access point of claim 2, wherein fan spins by magnetic levitation.

4. The hermetically sealed access point of claim 3, wherein the housing is made of fiberglass and the plate that the power source, the fan, and the motherboard attach to is a metal.

5. The hermetically sealed access point of claim 4, wherein the metal is aluminum.

6. The hermetically sealed access point of claim 5, wherein the housing is water resistant.

* * * * *